United States Patent Office 3,549,746
Patented Dec. 22, 1970

3,549,746
ANTIBIOTIC COMPOSITION
Alphonse Peter Granatek, Baldwinsville, Bernard Charles Nunning, Liverpool, Nicholas George Athanas, East Syracuse, Robert Lewis Dana, Liverpool, Edmund Stanley Granatek, Baldwinsville, and Raymond George Daoust, DeWitt, N.Y., assignors to Bristol-Myers Company, New York, N.Y., a corporation of Delaware
No Drawing. Filed Nov. 2, 1967, Ser. No. 679,982
Int. Cl. A61k 27/00
U.S. Cl. 424—35                  10 Claims

ABSTRACT OF THE DISCLOSURE

A pharmaceutical composition in unit dosage form comprising coated particles of certain penicillins such as dicloxacillin, the coating comprising ethylcelluose and a pharmaceutically acceptable wax; and a pharmaceutical carrier when administered orally to animals including man is useful in the treatment of bacterial infections.

BACKGROUND OF THE INVENTION

(1) Field of the invention

This invention relates to novel antibacterial compositions for oral administration. More particularly this invention relates to novel pleasant tasting penicillin compositions in unit dosage form which are useful for treating bacterial infections in animals including man.

(2) Description of the prior art

Penicillins have been used with considerable success in the treatment of bacterial infections in man. Unfortunately some of the penicillins and in particular the isoxazolyl series of penicillins e.g. oxacillin, cloxacillin, dicloxacillin and flucloxacillin as well as nafcillin and to some extent ampicillin and hetacillin have an extremely bitter taste. The taste has been difficult to mask by the mere addition of flavoring or sweetening agents. Therefore there exists a need for more palatable penicillin products for oral administration containing these unpleasant tasting penicillins. Thus an object of the present invention is to provide palatable penicillin compositions useful for oral administration in the treatment of bacterial infections in man.

SUMMARY OF THE INVENTION

The composition of the present invention comprises coated particles of a penicillin selected from the group consisting of ampicillin, hetacillin, nafcillin, oxacillin, cloxacillin, dicloxacillin, and flucloxacillin and mixtures thereof and a pharmaceutical carrier, wherein said coating comprises ethylcellulose and a pharmaceutically acceptable wax.

DETAILED DESCRIPTION

The compositions of this invention are suitable for oral administration to man. They are palatable and the penicillin contained therein is readily absorbed. The penicillin contained in the compositions is absorbed from the human gastrointestinal tract upon oral administration, substantially at the same rate as from like compositions containing the uncoated penicillin. This property of the compositions of this invention was totally unexpected in view of the teachings of various patents e.g. U.S. 2,805,977 that coating of medicaments with similar coating materials produces delayed release of the medicament. In treatment of bacterial infections it is desirable to quickly attain a blood level of the penicillin sufficient to combat the bacterial infection.

As used herein the terms oxacillin (3-phenyl-5-methyl-4-isoxazolylpencillin), cloxacillin [3-(3-chlorophenyl)-5-methyl-4-isoxazolylpenicillin], dicloxacillin [3-(2,6 - dichlorophenyl) - 5 - methyl - 4 - isoxazolylpenicillin] and flucloxacillin [3-(2-chloro-6-fluorophenyl) - 5 - methyl-4-isoxazolylpenicillin] include the free acid forms and the nontoxic, pharmaceutically acceptable cationic salts of those penicillins and the anhydrates and hydrates of those penicillins. The preparation and properties thereof have been described, inter alia, in U.S. Pats. 2,996,501, 3,239,507 and 3,317,389.

As used herein the term nafcillin (2-ethoxy-1-naphthylpenicillin) includes the free acid form and the nontoxic, pharmaceutically acceptable cationic salts of the penicillin and the anhydrates and hydrates of the penicillin. The preparation and properties thereof have been described, inter alia, in U.S. Pat. 3,157,639.

Ampicillin is the generic name for D-(—)-α-aminobenzylpenicillin. As used herein, the term ampicillin includes the free acid (i.e., amphoteric) form, the anionic salts with acids such as hydrochloric acid, and cationic salts with bases such as sodium hydroxide and the anhydrates and hydrates of that penicillin. Their preparation and properties have been described, inter alia, in U.S. Pats. 2,985,648, 3,140,282, 3,144,445 and 3,157,640 and in an application of our colleagues Herbert H. Silvestri and David A. Johnson filed Oct. 29, 1962 as U.S.S.N. 233,943 and issued Apr. 27, 1965 as U.S. Pat. 3,180,862.

Hetacillin is the generic name for 6-(2,2-dimethyl-5-oxo-4-phenyl-1-imidazolidinyl)penicillanic acid which has the structure

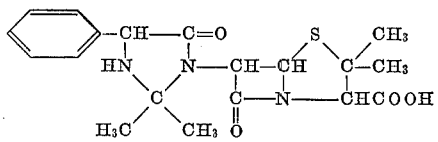

As used herein, the term hetacillin includes the "free acid" illustrated above and its nontoxic, pharmaceutically acceptable cationic salts of the acidic carboxylic acid group and its nontoxic, pharmaceutically acceptable acid addition anionic salts (ie., salts of the basic nitrogen), and the anhydrates and hydrates of that penicillin. Their preparation and properties are described in Belgian Pat. 642,851 and in an application of our colleagues David A. Johnson and Charles A. Panetta filed January 6, 1965, as U.S.S.N. 423,677 and issued Aug. 3, 1965, as U.S. Pat. 3,198,804.

The waxes useful in the coatings with ethylcellulose are the water insoluble pharmaceutically acceptable waxes including paraffin wax, ozokerite wax, ceresin wax, Utah wax, montan wax, carnauba wax, Japan wax, bayberry wax, flax wax, candelilla wax, sugar cane wax, spermaceti wax, beeswax, Chinese wax, shellac wax, Castorwax (hydrogenated castor oil), and the like. A single wax or mixture of waxes can be used. A preferred wax is spermaceti wax and a preferred mixture of waxes is spermaceti wax and Castorwax.

The penicillins used in the compositions of this invention are conveniently coated by a process which comprises suspending micronized particles of the penicillin in a solution of the coating material in a nonreactive volatile organic solvent, spray drying the suspension and recovering the coated penicillin particles. However any of the conventional coating methods can be used.

In carrying out the process, a suspension of micronized particles of the penicillin in a solution containing ethylcellulose and a pharmaceutically acceptable wax in a nonreactive volatile organic solvent or mixture of solvents is spray dried by spraying the suspension into a heated nonreactive gaseous medium to remove the solvent. The suspension contacts the gaseous medium as finely divided droplets. The term micronized as used herein means a particle size not greater than 30 microns.

The suspension of sodium dicloxacillin is sprayed into a gaseous medium, e.g. air, having a temperature of about 240° to 260° F. preferably about 250° F. to rapidly vaporize the solvent. The vaporized solvent is removed by the gaseous medium.

The solvent used to dissolve the coating material is vaporized and removed during spray drying. Thus the solvent must be volatile. Representative of useful solvents include methylene chloride, chloroform, cyclohexane, carbon tetrachloride, methylethylketone, acetone, and the like. The preferred solvent is methylene chloride.

The coated penicillin particles contain from about 7 parts by weight of coating material per part by weight of penicillin to about 9 parts by weight of penicillin per part of weight of coating material. The coated penicillin particles preferably contain about 1 to 3 parts by weight of coating material per part by weight of penicillin and in the most preferred embodiment 3 parts by weight of coating material per part by weight of penicillin. The coating preferably contains about 1 to 3 parts by weight of wax or mixture of waxes per part by weight of ethylcellulose.

While the coating of the penicillins must contain ethylcellulose and a pharmaceutically acceptable wax to achieve its desired properties, other coating materials can also be included e.g. hydrogenated peanut oil, cetyl alcohol, hydrogenated vegetable oil and the like.

The following combinations of coating materials are particularly useful: ethylcellulose-spermacetic wax, ethylcellulose-beeswax-Castorwax-cetyl alcohol, ethyl-cellulose-Castorwax-hydrogenated peanut oil-hydrogenated vegetable oil with lecithin-sesame oil, ethylcellulose-paraffin wax, and ethylcellulose-spermacetic-Castorwax-paraffin wax.

The coated penicillin particles for use in the compositions of this invention have a size not larger than 40 mesh (U.S.) and particles having a size of not larger than 150 mesh (U.S.) are preferred.

In a preferred embodiment of the present invention dicloxacillin coated with ethylcellulose and spermaceti wax is empolyed in the composition. In the preparation of the coated dicloxacillin, a suspension comprising dicloxacillin ethylcellulose, spermaceti wax and methylene chloride is sprayed into air at about 250° F. Ethylcellulose and spermaceti wax are present in the suspension in the proportion of 1 part by weight per part by weight of sodium dicloxacillin and 2 parts by weight per part by weight of sodium dicloxacillin respectively. The solvent, methylene chloride, is present in the proportion of from about 7½ to 15 liters per kilogram of sodium dicloxacillin, ethyl cellulose and spermaceti wax. The suspension flow rate is adjusted to obtain proper evaporation of the methylene chloride.

The compositions of the present invention are provided for administration to animals in solid and liquid unit dosage forms, such as tablets, capsules, powders, pills, granules, syrups, elixirs and the like. Suitable carriers for use in the compositions are gelatin capsules, sugars, cellulose derivatives, such as sodium carboxymethyl cellulose, gelatin, talc, magnesium sterate, vegetable oils such as peanut oil, etc., liquid petroleum, glycerin, sorbitol, ethanol, agar, water and the like. The compositions can also contain suitable preservatives, coloring and flavoring agents. The carrier may serve as a binder and the composition may be tabletted. If the carrier is a gelatin capsule, the coated penicillin may be encapsulated into the gelatin capsule by conventional means. If a liquid carrier is used, the composition may be in the form of a suspension.

The compositions of this invention offer all of the established therapeutic benefits of other oral preparations of the specified penicillins, e.g. dicloxacillin. Thus, they may be used for the control of infections sensitive to the specified penicillins, e.g. dicloxacillin sensitive organisms causing respiratory tract infections. The ampicillin and hetacillin compositions of this invention are effective against Gram-positive as well as many Gram-negative organisms; and the oxacillin, dicloxacillin, flucloxacillin, nafcillin and cloxacillin compositions are particularly effective against Gram-positive bacteria including especially those resistant to benzylpenicillin.

The compositions are administered in the same dosage as other oral preparations containing the same penicillins, e.g. dicloxacillin. Thus, for children the composition may be administered to provide daily about 50 mg. ampicillin or cloxacillin or oxacillin, or 25 mg. of hetacillin or nafcillin or 12.5 mg. of flucloxacillin or dicloxacillin per kg. of body weight per day given in three or four divided doses. For adults the composition may be administered to provide daily about 1 g. of ampicillin or cloxacillin or hetacillin, or nafcillin or 2 g. oxacillin or 500 mg. of dicloxacillin or flucloxacillin given in three or four divided doses in dosage units of for example 125 or 250 or 500 mg. of penicillin. Oral suspensions containing from about 50 to about 125 mg. of penicillin and preferably from about 60 to 70 mg. of penicillin per teaspoonful are convenient dosage forms. In particularly severe infections the foregoing dosages are doubled.

The following examples are intended to illustrate the invention claimed herein without unduly restricting it.

EXAMPLE 1

Spray coated ethylcellulose-spermaceti-sodium dicloxacillin

Formula

| | | Amounts for 1000 grams |
|---|---|---|
| Sodium dicloxacillin, micronized | grams | 250.0 |
| Ethylcellulose (viscosity 100 cps.) | do | 250.0 |
| Spermaceti wax | do | 500.0 |
| Methylene chloride | liters | 15.0 |

Manufacturing instructions (1) Dissolve the spermaceti wax in approximately 8 liters of methylene chloride. The operation is carried out in a 20 liter glass or stainless steel container with the aid of a mixer (e.g. a Lightnin mixer). No heat is required.

(2) To the clear solution obtained in Step #1, add the ethylcellulose in small portions while maintaining agitation. Stir until a clear and relatively viscous solution is obtained.

(3) The sodium dicloxacillin is then added in small portions while maintaining agitation. A milky white suspension will result.

(4) Strain the solution obtained in Step #3 through three layers of cheesecloth if necessary to remove any particulate contaminants.

(5) The remainder of the methylene chloride (7 liters) is then added while agitation is maintained and complete dispersion of the sodium dicloxacillin is effected. The dispersion must be free from small lumps or agglomerates.

(6) The Nerco-Niro Laboratory model spray drier is readied as follows for the following conditions:

Note: Assemble completely before starting except for the atomizer.

(a) Turn on the electric heater to setting #2 or 3 until the inlet air gauge reads around 130° C.

(b) When equilibrium is reached:

The inner air gauge will read—115°–120° C.
The outlet air gauge will read—50°–55° C.

(c) Install the turbine atomizer in its proper position over a Teflon gasket and feed compressed air until the atomizer gauge reads 6 kg./cm.². At this point maximum compressed air pressure is in use (90–100 lbs.) and the turbine is turning at a rate of 40,000 r.p.m. Allow 5 minutes for equilibrium in the chamber before liquid feeding is commenced.

(d) Start liquid feed to the turbine from a 2 liter separatory funnel connected to the turbine by a short piece of Teflon tubing. Feed at a rate of 60 ml. to 80 ml. per minute.

(e) Monitor the operation to maintain the following drying conditions throughout the entire operation:

Inlet air: 115°–120° C.
Outlet air: 60°–70° C.

(f) Stop the atomizer and turn the electric heater to position M (exhaust fan). Allow 5 minutes in this position before lifting cover.

(g) Lift cover with the aid of the hydraulic lift and collect product from the walls.

(h) The product is not expected to stick to the walls of the chamber other than by electrostatic forces.

(i) Dry product in vacuum oven overnight at room temperature. The methylene chloride residue is less than 0.5%.

(j) The free flowing coated sodium dicloxacillin product is passed through a 40 mesh screen and collected.

EXAMPLE 2

Spray coated sodium dicloxacillin for oral suspension, 62.5 mg./5 ml. (ethylcellulose-spermaceti coating)

| Formula | Per 60 ml. |
|---|---|
| Sodium dicloxacillin (spray coated ethylcellulose - spermaceti from Example 1) | [1] 0.825 gram (dicloxacillin activity), 3.7 g. |
| Sodium cyclamate | 2.400 grams. |
| Sodium saccharin | 0.400 gram. |
| Sodium citrate, anhydrous | 0.420 gram. |
| Sodium benzoate | 0.060 gram. |
| Sodium chloride | 1.200 grams. |
| Gum tragacanth | 0.425 gram. |
| Kaolin | 6.000 grams. |
| Sucrose, 30 mesh | 25.000 grams. |
| Dye | 0.500 gram. |
| Flavors | 0.930 gram. |

[1] This figure represents dicloxacillin activity and includes 10% excess. To calculate the amount of sodium dicloxacillin to be used, apply the following formula:

$$\frac{0.825\times1000}{\text{Potency of coated sodium dicloxacillin in mcg./mg.}}=\text{Grams coated sodium dicloxacillin to use per bottle.}$$

Manufacturing instructions (1) Mix all of the ingredients except the spray coated sodium dicloxacillin and the kaolin with approximately one-third of the sucrose in a suitable blender. Mix for 30 minutes.

(2) Add the blend from Step #1 to the remainder of the sucrose and add the kaolin. Mix for 30 minutes.

(3) Add the spray coated sodium dicloxacillin to the blend in Step #2 and mix for 30 minutes.

(4) Fill into 3 oz. round flint bottles.

Reconstitution: Add a sufficient volume of distilled water to make 60.0 ml. This will yield a suspension having 10% over the label claim potency of 62.5 mg. per 5 ml. of sodium dicloxacillin activity.

EXAMPLE 3

Spray coated ethylcellulose-spermaceti-Castorwax-sodium dicloxacillin

| Formula | | Amount per 1000 grams |
|---|---|---|
| Sodium dicloxacillin, micronized | grams | 250.0 |
| Ethylcellulose (viscosity 100 c.p.s.) | do | 250.0 |
| Spermaceti wax | do | 416.5 |
| Castorwax (melting point 85° C.) | do | 83.5 |
| Methylene chloride | liters | 7.575 |

Note: The preparation must be kept at a temperature of 20° to 25° C. to prevent the waxes from precipitating out of solution.

Manufacturing instructions (1) In a suitable stainless steel container and with the aid of a mixer, (e.g. a Lightnin mixer) dissolve the spermaceti and the Castorwax with methylene chloride. If necessary use steam as a heat source in order to maintain a temperature of about 25° C. and facilitate dissolution of the Castorwax.

(2) To the clear solution obtained in Step #1, add the ethylcellulose in small portions while maintaining agitation until a clear viscous solution is obtained.

(3) To the solution in Step #2 add the sodium dicloxacillin in small portions while maintaining agitation. Continue mixing until a milky white suspension is obtained. It must be free from lumps or small aggregates.

(4) Pass the solution obtained in Step #3 through three layers of cheesecloth if necessary in order to remove particulate contaminants.

(5) Transfer the dispersion from Step #4 into the Graco pump and spray gun assembly (Monarch model). Connect the pump to the 100 lbs. compressed air supply and circulate the dispersion for at least 5 minutes by manually adjusting the air pressure to 60 lbs.

(6) Fit the Graco spray gun with tip #DLN–C1150 (.011").

(7) Assemble the Nerco-Niro Laboratory spray drier completely with the exception of the air driven atomizing turbine and establish the following temperature equilibrium:

Inlet air: 115°–120° C.
Outlet air: 45°–50° C.

(8) Remove the porthole from the side of the spray drier, insert the spray gun and activate the gun maintaining constant spraying.

(9) Occasionally inspect the gun for clogging, remove and clean tip if necessary.

(10) Collect the product and dry in the vacuum oven at room temperature overnight. The methylene chloride residue is less than 0.5%.

(11) The free flowing coated sodium dicloxacillin product is passed through a 40 mesh screen and collected.

EXAMPLE 4

Spray coated sodium dicloxacillin powder for oral suspension 62.5 mg./5 ml. (ethylcellulose-spermaceti-Castorwax coating)

| Formula | Per 60 ml. |
|---|---|
| Sodium dicloxacillin (spray coated ethylcellulose - spermaceti-Castorwax from Example 3) | [1] 0.825 gram. (dicloxacillin activity), 3.7 g. |
| Sodium cyclamate | 2.400 grams. |
| Sodium Saccharin | 0.400 gram. |
| Sodicm citrate, anhydrous | 0.420 gram |
| Sodium benzoate | 0.060 gram. |
| Sodium chloride | 1.200 grams. |
| Gum tragacanth | 0.425 gram. |
| Kaolin N.F. ...NN | 6.000 grams. |
| Sucrose, 30 mesh | 25.000 grams. |
| Dye | 0.500 gram. |
| Flavors | 0.930 gram. |

[1] This figure represents dicloxacillin activity and includes a 10% excess. To calculate the amount of sodium dicloxacillin to be used, apply the following formula:

$$\frac{0.825\times1000}{\text{Potency of coated sodium dicloxacillin in mcg./mg.}}=\text{Grams coated sodium dicloxacillin to use per bottle.}$$

Manufacturing instructions (1) Mix all of the ingredients except the spray coated sodium dicloxacillin and the kaolin with approximately one-third of the sucrose in a suitable blender. Mix for 30 minutes.

(2) Add the blend from Step #1 to the remainder of the sucrose and add the kaolin. Mix for 30 minutes.

(3) Add the spray coated sodium dicloxacillin to the blend in Step #2 and mix for 30 minutes.

(4) Fill into 3 oz. round flint bottles.

Reconstitution: Add a sufficient volume of distilled water to make 60.0 ml. This will yield a suspension having 10% over the label claim potency of 62.5 mg. per 5 ml. of sodium dicloxacillin activity.

EXAMPLE 5

Spray coated ethylcellulose-Castorwax-beeswax-cetyl alcohol-sodium dicloxacillin Formula

| | Amounts per 1000 grams |
|---|---|
| Sodium dicloxacillin, micronized _____grams__ | 250.0 |
| Ethylcellulose (viscosity 100 cps.) _____do____ | 250.0 |
| Castorwax (melting point 285° C.) _____do____ | 100.0 |
| Beeswax _____do____ | 300.0 |
| Cetyl alcohol _____do____ | 100.0 |
| Methylene chloride _____liters__ | 7.575 |

Note: This preparation must be kept at a temperature of 20° C. to 25° C. to prevent the waxes from precipitating out of solution.

Manufacturing instructions (1) In a suitable stainless steel container and with the aid of a mixer (e.g. a Lightnin mixer) dissolve the Castorwax, beeswax, and cetyl alcohol with methylene chloride. If necessary use steam as a heat source in order to maintain a temperature of about 25° C. and facilitate dissolution of the Castorwax.

(2) To the clear solution obtained in Step #1, add the ethylcellulose in small portions while maintaining agitation until a clear viscous solution is obtained.

(3) To the solution in Step #2 add the sodium dicloxacillin in small portions while maintaining agitation. Continue mixing until a milky white suspension is obtained. It must be free from lumps or small aggregates.

(4) Pass the solution obtained in Step #3 through three layers of cheesecloth if necessary in order to remove particulate contaminants.

(5) Transfer the dispersion from Step #4 into the Graco pump and spray gun assembly (Monarch model). Connect the pump to the 100 lbs. compressed air supply and circulate the dispersion for at least 5 minutes by manually adjusting the air pressure to 60 lbs.

(6) Fit the Graco spray gun with tip #DLN–C1150 (.011").

(7) Assemble the Nerco-Niro Laboratory spray drier completely with the exception of the air driven atomizing turbine and establish the following temperature equilibrium:

Inlet air: 115° C.–120° C.
Outlet air: 45° C.–50° C.

(8) Remove the porthole from the side of the spray drier, insert the spray gun and activate the gun maintaining constant spraying.

(9) Occasionally inspect the gun for clogging, remove and clean tip if necessary.

(10) Collect the product and dry in the vacuum oven at room temperature overnight. The methylene chloride residue is less than 0.5%.

(11) The free flowing coated sodium dicloxacillin is passed through a 40 mesh screen and collected.

EXAMPLE 6

Spray coated sodium dicloxacillin for oral suspension, 62.5 mg./5 ml. (ethylcellulose-beeswax-Castorwax-cetyl alcohol coating).

Formula

| | Per 60 ml. |
|---|---|
| Sodium dicloxacillin (spray coated ethylcellulose-beeswax - Castorwaxcetyl alcohol from Example 5)____ | [1] 0.825 gram (dicloxacillin activity), 3.7 g. |
| Sodium cyclamate ________ | 2.400 grams. |
| Sodium saccharin _________ | 0.400 gram. |
| Sodium citrate, anhydrous __ | 0.420 gram. |
| Sodium benzoate _________ | 0.060 gram. |
| Sodium chloride __________ | 1.200 grams. |
| Gum tragacanth, Soluble Product Corp. _________ | 0.425 gram. |
| Kaolin __________________ | 6.000 grams. |
| Sucrose, 30 mesh _________ | 25.000 grams. |
| Dye ____________________ | 0.500 gram. |
| Flavors __________________ | 0.930 gram. |

[1] This figure represents dicloxacillin activity and includes a 10% excess. To calculate the amount of sodium dicloxacillin to be used, apply the following formula:

$$\frac{0.825\times1000}{\text{Potency of coated sodium dicloxacillin in mcg./mg.}}=\text{Grams coated sodium dicloxacillin to use per bottle.}$$

Manufacturing instructions (1) Mix all of the ingredients except the spray coated sodium dicloxacillin and the kaolin with approximately one-third of the sucrose in a suitable blender. Mix for 30 minutes.

(2) Add the blend from Step #1 to the remainder of the sucrose and add the kaolin. Mix for 30 minutes.

(3) Add the spray coated sodium dicloxacillin to the blend in Step #2 and mix for 30 minutes.

(4) Fill into 3 oz. round flint bottles.

Reconstitution: Add a sufficient volume of distilled water to make 60.0 ml. This will yield a suspension having 10% over the label claim potency of 62.5 mg. per 5 ml. of sodium dicloxacillin activity.

EXAMPLE 7

Spray coated ethylcellulose-Castorwax-hydrogenated peanut oil flakes-aratex-seasame oil-sodium dicloxacillin Formula

| | Amounts per 1000 grams |
|---|---|
| Sodium dicloxacillin, micronized _______grams__ | 250.0 |
| Ethylcellulose (viscosity 100 cps.) ________do____ | 250.0 |
| Hydrogenated peanut oil flakes __________do____ | 163.0 |
| Hydrogenated vegetable oil with lecithin (Aratex, Durkee Famous Foods) ____________grams__ | 163.0 |
| Castorwax (melting point 85° C.) ________do____ | 111.0 |
| Sesame oil, U.S.P. ___________________do____ | 63.0 |
| Methylene chloride ___________________liters__ | 7.575 |

Note: This preparation must be kept at a temperature of 20° C. to 25° C. to prevent the waxes from precipitating out of solution.

Manufacturing instructions (1) In a suitable stainless steel container and with the aid of a mixer, (e.g. a Lightnin mixer) dissolve the Castorwax hydrogenated peanut oil flakes, Aratex and sesame oil with methylene chloride. If necessary use steam as a heat source in order to maintain a temperature of about 25° C. and facilitate dissolution of the Castorwax.

(2) To the clear solution obtained in Step #1, add the ethylcellulose in small portions while maintaining agitation until a clear viscous solution is obtained.

(3) To the solution in Step #2 add the sodium dicloxacillin in small portions while maintaining agitation. Continue mixing until a milky white suspension is obtained. It must be free from lumps or small aggregates.

(4) Pass the solution obtained in Step #3 through three layers of cheesecloth, if necessary, to remove particulate contaminants.

(5) Transfer the dispersion from Step #4 into the Graco pump and spray gun assembly (Monarch model). Connect the pump to the 100 lbs. compressed air supply and circulate the dispersion for at least 5 minutes by manually adjusting the air pressure to 60 lbs.

(6) Fit the Graco spray gun with tip #DLN–C1150 (.011″).

(7) Assemble the Nerco-Niro Laboratory spray drier completely with the exception of the air driven atomizing turbine and establish the following temperature equilibrium:

Inlet air: 115° C.–120° C.
Outlet air: 45° C.–50° C.

(8) Remove the porthole from the side of the spray drier, insert the spray gun and activate the gun maintaining constant spraying.

(9) Occasionally inspect the gun for clogging, remove and clean tip if necessary.

(10) Collect the product and dry in the vacuum oven at room temperature overnight. The methylene chloride residue is less than 0.5%.

(11) The free flowing coated sodium dicloxacillin product is passed through a 40 mesh screen and collected.

EXAMPLE 8

Spray coated sodium dicloxacillin for oral suspension, 62.5 mg. 5 ml. (ethylcellulose-Castorwax-Aratex-sesame oil-hydrogenated peanut oil coating

| Formula | Per 60 ml. |
|---|---|
| Sodium dicloxacillin (spray coated ethylcellulose-Castorwax - Aratextex-sesame oil-hydrogenated peanut oil from Example 7) | [1] 0.825 gram (dicloxacillin activity), 3.7 g. |
| Sodium cyclamate | 2.400 grams. |
| Sodium saccharin | 0.400 gram. |
| Sodium citrate, anhydrous | 0.420 gram. |
| Sodium benzoate | 0.060 gram. |
| Sodium chloride | 1.200 grams. |
| Gum tragacanth | 0.425 gram. |
| Kaolin | 6.000 grams. |
| Sucrose, 30 mesh | 25.000 grams. |
| Dye | 0.500 gram. |
| Flavors | 0.930 gram. |

[1] This figure represents dicloxacillin activity and includes a 10% excess. To calculate the amount of sodium dicloxacillin to be used, apply the following formula:

$$\frac{0.825 \times 1000}{\text{Potency of coated sodium dicloxacillin in mcg./mg.}} = \begin{array}{l}\text{Grams coated sodium}\\ \text{dicloxacillin to use}\\ \text{per bottle.}\end{array}$$

Manufacturing instructions (1) Mix all of the ingredients except the spray coated sodium dicloxacillin and the kaolin with approximately one-third of the sucrose in a suitable blender. Mix for 30 minutes.

(2) Add the blend from Step #1 to the remainder of the sucrose and add the kaolin. Mix for 30 minutes.

(3) Add the spray coated sodium dicloxacillin to the blend in Step #2 and mix for 30 minutes.

(4) Fill into 3 oz. round flint bottles.

Reconstitution: Add a sufficient volume of distilled water to make 60.0 ml. This will yield a suspension having 10% over the label claim potency of 62.5 mg. per 5 ml. of sodium dicloxacillin activity.

EXAMPLE 9

Spray coated ethylcellulose-spermaceti-Castorwax-sodium dicloxacillin

Formula

| | Amounts for 1000 grams |
|---|---|
| Sodium dicloxacillin, micronized grams | 250.0 |
| Ethylcellulose (viscosity 100 cps.) do | 250.0 |
| Spermaceti wax do | 333.0 |
| Castorwax (melting point 85° C.) do | 167.0 |
| Methylene chloride liters | 15.0 |

Note: This preparation must be prepared and kept at a temperature of 20°–25° C. in order to maintain solubility of the Castorwax. Lower temperatures will innevitably lead to wax precipitation. The use of steam is recommended as a source of heat.

Manufacturing instructions (1) Dissolve the spermaceti wax and Castorwax in 15 liters of methylene chloride. The operation is carried out in a stainless steel container with the aid of a mixer, (e.g. a Lightnin mixer). Maintain the temperature at about 20°–25° C. with the aid of steam if necessary.

(2) To the clear solution obtained in Step #1, add the ethylcellulose in small portions while maintaining agitation. Stir until a clear and relatively viscous solution is obtained.

(3) The sodium dicloxacillin is then added in small portions while maintaining agitation. A milky white suspension will result. The dispersion must be free from small lumps or agglomerates.

(4) Strain the solution obtained in Step #3 through three layers of cheesecloth if necessary to remove any particulate contaminants.

(5) The Nerco-Niro Laboratory Model spray drier is readied as follows for the following conditions:

Note: Assemble completely before starting except for the atomizer.

(a) Turn on the electric heater to setting #2 or 3 until the inlet air gauge reads around 130° C.

(b) When equilibrium is reached:

The inlet air gauge will read—115°–120° C.
The outlet air gauge will read—50°–55° C.

(c) Install the turbine atomizer in its proper position over a Teflon gasket and feed compressed air until the atomizer gauge reads 6 kg./cm.$^2$. At this point maximum compressed air pressure is in use (90–100 lbs.) and the turbine is turning at a rate of 40,000 r.p.m. Allow 5 minutes for equilibrium in the chamber before liquid feeding is commenced.

(d) Start liquid feed to the turbine from a 2 liter separatory funnel connected to the turbine by a short piece of Teflon tubing. Feed at a rate of 60 to 80 ml. per minute.

(e) Monitor the operation to maintain the following drying conditions throughout the entire operation:

Inlet air: 115°–120° C.
Outlet air: 60°–70° C.

(f) Stop the atomizer and turn the electric heater to position M (exhaust fan) allow 5 minutes in this position before lifting cover.

(g) Lift cover with the aid of the hydraulic lift and collect product from the walls. The product is not expected to stick to the walls of the chamber other than by electrostatic forces.

(h) Dry product in vacuum oven overnight at room temperature. The methylene chloride residue is less than 0.5%.

(i) The free flowing coated sodium dicloxacillin product is passed through a 40 mesh screen and collected.

EXAMPLE 10

Spray coated sodium dicloxacillin for oral suspension, 62.5 mg./5 ml. (ethylcellulose-spermaceti-Castorwax coating)

| Formula | Per 60 ml. |
|---|---|
| Sodium dicloxacillin (spray coated ethylcellulose - spermaceti - Castorwax from Example 9) | [1] 0.825 gram (dicloxacillin activity), 3.7 g. |
| Sodium cyclamate | 2.400 grams. |
| Sodium saccharin | 0.400 gram. |
| Sodium citrate, anhydrous | 0.420 gram. |
| Sodium benzoate | 0.060 gram. |
| Sodium chloride | 1.200 grams. |
| Gum tragacanth | 0.425 gram. |
| Kaolin | 6.000 grams. |
| Sucrose, 30 mesh | 25.000 grams. |
| Dye | 0.500 gram. |
| Flavors | 0.930 gram. |

[1] This figure represents dicloxacillin activity and includes a 10% excess. To calculate the amount of sodium dicloxacillin to be used, apply the folowing formula:

$$\frac{0.825 \times 1000}{\text{Potency of coated sodium dicloxacillin in meg./mg.}} = \text{Grams coated sodium dicloxacillin to use per bottle.}$$

Manufacturing instructions (1) Mix all of the ingredients except the spray coated sodium dicloxacillin and the kaolin with approximately one-third of the sucrose in a suitable blender. Mix for 30 minutes.

(2) Add the blend from Step #1 to the remainder of the sucrose and add the kaolin. Mix for 30 minutes.

(3) Add the spray coated sodium dicloxacillin to the blend in Step #2 and mix for 30 minutes.

(4) Fill into 3 oz. round flint bottles.

Reconstitution: Add a sufficient volume of distilled water to make 60.0 ml. This will yield a suspension having 10% over the label claim potency of 62.5 mg. per 5 ml. of sodium dicloxacillin activity.

EXAMPLE 11

A comparison was made of the blood levels obtained by oral administration of suspensions containing coated dicloxacillin with the blood levels obtained by oral administration of like suspensions containing uncoated dicloxacillin. A crossover study was used to determine the blood levels of the penicillin in human subjects. The results of the study are recorded in Tables I and II below:

TABLE I

| | Average blood level for 12 patients, mg./ml. | | | | |
|---|---|---|---|---|---|
| | Hours after administration | | | | |
| | ½ | 1 | 2 | 3 | 4 |
| Suspension: | | | | | |
| Control | 2.42 | 3.33 | 2.15 | 1.05 | 0.45 |
| Example 2 | 3.72 | 3.04 | 2.82 | 1.57 | 0.82 |

TABLE II

| | Average blood level for 12 patients, mg./ml. | | | | |
|---|---|---|---|---|---|
| | Hours | | | | |
| | ½ | 1 | 2 | 3 | 4 |
| Suspension: | | | | | |
| Control | 3.28 | 3.71 | 2.23 | 0.95 | 0.45 |
| Example 4 | 2.84 | 3.53 | 3.11 | 1.99 | 0.98 |
| Example 6 | 2.88 | 3.75 | 2.50 | 1.23 | 0.71 |
| Example 8 | 2.47 | 3.74 | 2.63 | 1.41 | 0.83 |

For purposes of comparison the control suspension was prepared according to the procedure of Example 2, however uncoated dicloxacillin was used in place of coated dicloxacillin.

Five ml. of each of the suspensions were administered orally to each of twelve subjects, and the blood levels attained thereby were measured after periods of ½, 1, 2, 3, and 4 hours after administration.

It is obvious by inspection of the tables that the suspensions employing coated dicloxacillin gave blood levels comparable to those attained with the suspensions employing uncoated dicloxacillin.

EXAMPLE 12

According to the procedure of Example 2, eight oral suspensions are prepared in which dicloxacillin is replaced on an activity per 5 ml. basis, with 62.5 mg. ampicillin, 62.5 mg. hetacillin, 62.5 mg. cloxacillin, 62.5 mg. flucloxacillin, 62.5 mg. nafcillin, a mixture containing 125 mg. of ampicillin and 62.5 mg. of dicloxacillin, a mixture containing 125 mg. of hetacillin and 62.5 mg. of dicloxacillin, a mixture containing 125 mg. of ampicillin and 62.5 mg. of cloxacillin, and a mixture containing 125 mg. of hetacillin and 62.5 mg. of cloxacillin, respectively, which have been previously coated as described in Example 1 above.

EXAMPLE 13

Spray coated ethylcellulose-spermaceti-Castorwax-ampicillin trihydrate

| Formula: | | Amounts for 1000 grams |
|---|---|---|
| Ampicillin trihydrate, micronized | grams | 900.0 |
| Ethylcellulose (viscosity 100 cps.) | do | 33.3 |
| Spermaceti wax | do | 44.5 |
| Castorwax (melting point 85° C.) | do | 22.2 |
| Methylene chloride | liters | 9.0 |

Manufacturing instructions

Dissolve the ethylcellulose, spermaceti wax and Castorwax in 9.0 liters of methylene chloride at room temperature. Then add and disperse the micronized ampicillin trihydrate. Mix until uniform and strain through three layers of cheesecloth to remove any particulate contaminates. Spray dry (apparatus and method described in Example 9) using air inlet temperature of 125°–135° C. and outlet temperature of 50°–70° C. The product coated ampicillin trihydrate is spread on trays and dried overnight at room temperature and then passed through a 40 mesh screen and collected.

EXAMPLE 14.—SPRAY COATED AMPICILLIN TRIHYDRATE FOR ORAL SUSPENSION 125 mg./ETHYLCELLULOSE-SPERMACETI-CASTORWAX COATING)

| | Per 60 ml. | | |
|---|---|---|---|
| Formula | A | B | C |
| Ampicillin trihydrate [2], gm | [1] 1.575 gram | | |
| | 2.07 | 2.07 | 20.L |
| Sucrose, gm | 28.0 | 28.0 | 25.0 |
| Sodium cyclamate, gm | 2.10 | 2.10 | 2.2 |
| Sodium benzoate, gm | 0.06 | .06 | 0.06 |
| Colloidal magnesium aluminum silicate, gm [3] | 6.0 | 7.0 | 8.0 |
| Citric acid anhydrous, gm | 0.20 | 0.23 | 0.263 |
| Dye, gm | 1.50 | 1.50 | 1.50 |
| Flavors, gm | 0.94 | 1.53 | 1.53 |
| Reconstitution water volume, ml | 34 | 33 | 34 |

[1] This figure represents ampicillin trihydrate activity and includes a 5% excess. To calculate the amount of ampicillin trihydrate to be used, apply the following formula:

$$\frac{1.575 \times 1000}{\text{Potency of coated ampicillin trihydrate in mcg./mg.}} = \text{Grams coated ampicillin trihydrate to use per bottle.}$$

[2] Spray coated Ethylcellulose-Spermaceti, Castorwax from Example 13.

[3] Veegum F, Vanderbilt Company Inc.

NOTE.—Manufacturing instructions:

(1) Mix all of the ingredients except the spray coated ampicillin trihydrate and the colloidal magnesium aluminum silicate with approximately one-third of the sucrose in a suitable blender. Mix for 30 minutes.

(2) Add the blend from Step #1 to the remainder of the sucrose and add the colloidal magnesium aluminum silicate. Mix for 30 minutes.

(3) Add the spray coated ampicillin trihydrate to the blend in Step #2 and mix for 30 minutes.

(4) Fill into 3 oz. flint bottles.

Reconstitution: Add a sufficient volume of distilled water to make 60.0 ml. This will yield a suspension having 5% over the label claim potency of 125 mg. per 5 ml. of ampicillin activity.

EXAMPLE 15

According to the procedure of Example 14 an oral suspension is prepared in which ampicillin trihydrate is replaced, on an activity per 5 ml. basis, with 125 mg. of anhydrous ampicillin which has been previously coated as described in Example 13.

EXAMPLE 16

Sodium dicloxacillin monohydrate capsules

Formula

| | Per capsule |
|---|---|
| Sodium dicloxacillin (ethylcellulose - spermaceti spray coated from Example 1). | 62.5 mg., 125 mg. or 250 mg. activity. |
| Anhydrous lactose, U.S.P. | Q.s. |
| Magnesium stearate, U.S.P. | Q.s. |

Manufacturing procedure (1) Blend the magnesium sterate, the anhydrous lactose and the spray coated sodium dicloxacillin and fill into a suitable capsule size.

EXAMPLE 17

Sodium dicloxacillin monohydrate tablets

Formula

| | Per tablet |
|---|---|
| Sodium dicloxacillin (ethylcellulose, spermaceti spray coated from Example 1). | 62.5 mg., 125 mg. or 250 mg. activity. |
| Carbowax 6000, micropulverized | 41.5 to 100 mg. |
| Magnesium stearate, U.S.P. | A sufficient quantity. |

Manufacturing procedure (1) Blend the sodium dicloxacillin, the Carbowax and mangesium stearate in a suitable mixer. Tablet by direct compression to a suitable hardness.

EXAMPLE 18

Sodium dicloxacillin monohydrate tablets

Formula

| | Per tablet |
|---|---|
| Sodium dicloxacillin (ethylcellulose - spermaceti spray coated from Example 1). | 62.5 mg., 125 mg. or 250 mg. activity. |
| Calcium carbonate starch granules, 60 mesh. | 200 mg. to 500 mg. |
| Sucrose, U.S.P. powdered | 100 mg. to 250 mg. |
| Magnesium stearate, U.S.P. | Q.s. as required. |

Manufacturing procedure (1) Blend all the ingredients together in a suitable mixer. Tablet by direct compression to a suitable hardness.

EXAMPLE 19

According to the procedure of Example 16, five lots of capsules are produced in which dicloxacillin is replaced, on a per capsule basis, with 125 mg. ampicillin, 125 mg. hetacillin, 125 mg. oxacillin, 125 mg. cloxocillin, 125 mg. flucloxacillin, 125 mg. of nafcillin, a mixture containing 125 mg. of ampicillin and 62.5 mg. of dicloxacillin, a mixture containing 125 mg. of hetacillin and 62.5 mg. of dicloxacillin, a mixture containing 125 mg. of ampicillin and 62.5 mg. of cloxacillin, and a mixture containing 125 mg. of hetacillin and 62.5 mg. of cloxacillin, respectively, which have been previously coated as described in Example 1 above.

EXAMPLE 20

According to the procedure of Example 17, five lots of tablets are produced in which dicloxacillin is replaced, on a per tablet basis, with 125 mg. ampicillin, 125 mg. hetacillin, 125 mg. oxacillin, 125 mg. cloxacillin, 125 mg. flucloxacillin, and 125 mg. of nafcillin, a mixture containing 125 mg. of ampicillin and 62.5 mg. of dicloxacillin, in a mixture containing 125 mg. of hetacillin and 62.5 mg. of dicloxacillin, a mixture containing 125 mg. of ampicillin and 62.5 mg. of cloxacillin, and a mixture containing 125 mg. of hetacillin and 62.5 mg. of cloxacillin, respectively, which have been previously coated as described in Example 1 above.

EXAMPLE 21

According to the procedure of Example 18, five lots of tablets are produced in which dicloxacillin is replaced, on a per tablet basis, with 125 mg. ampicillin, 125 mg. hetacillin, 125 mg. oxacillin, 125 mg. cloxacillin, 125 mg. flucloxacillin, 125 mg. of nafcillin, a mixture containing 125 mg. of ampicillin and 62.5 mg. of dicloxacillin, a mixture containing 125 mg. of hetacillin and 62.5 mg. of dicloxacillin, a mixture containing 125 mg. of ampicillin and 62.5 mg. of cloxacillin, and a mixture containing 125 mg. of hetacillin and 62.5 mg. of cloxacillin, respectively, which have been previously coated as described in Example 1 above.

In the present invention and particularly in the examples, hetacillin free acid is taken as the standard with an activity of 1000 mcg./mgm. and when other salts are used, the weight taken is that which gives an equivalent amount of activity, i.e., 1096 mgms. of potassium hetacillin are equivalent in activity to 1000 mgms. of hetacillin free acid. The relationship is stoichiometric.

In the case of ampicillin the standard with an activity of 1000 mcg./mgm. is anhydrous ampicillin and thus ampicillin trihydrate has a potency of 865 mcg./mgm.

In the case of dicloxacillin, the standard is the free acid with an activity of 1000 mcg./mgm. and thus the sodium salt is 920 mcg./mgm.

In the actual formulations use is often made as is customary in this field of an overfill, e.g., of ten percent, of each active ingredient as compared to labelled potency.

While this invention has been described in terms of its preferred embodiment, those skilled in the art will appreciate that modifications can be made without departing from the spirit and scope of this invention.

We claim:

1. A pharmaceutical composition in unit dosage form which comprises coated particles having a particle size not larger than 40 mesh of a micronized penicillin selected from the group consisting of ampicillin, hetacillin, nafcillin, oxacillin, cloxacillin, dicloxacillin, and flucloxacillin and mixtures thereof and a pharmaceutical carrier; wherein said coated particles comprise from about 9 parts by weight of penicillin per part by weight of coating to about 7 parts by weight of coating per part by weight of penicillin and said coating comprises ethylcellulose and from about 1 to about 3 parts by weight of spermaceti wax per part by weight of ethylcellulose.

2. The composition of claim 1 wherein said penicillin is dicloxacillin.

3. The composition of claim 1 wherein said penicillin is dicloxacillin and said coated particles comprise about 3 parts by weight of coating per part by weight of dicloxacillin and said coating comprises about 2 parts by weight of spermaceti wax per part by weight of ethylcellulose.

4. The composition of claim 1 where said penicillin is dicloxacillin and said coated particles comprise about 3 parts by weight of coating per part by weight of dicloxacillin and said coating comprises about 1.7 parts by weight of spermaceti wax and 0.3 part by weight of hydrogenated castor oil per part by weight of ethylcellulose.

5. The composition of claim 4 comprising at least about 50 mgm. of said penicillin.

6. The composition of claim 1 wherein said penicillin is ampicillin.

7. The composition of claim 1 wherein said penicillin is ampicillin and said coated particles comprise about 9 parts by weight of ampicillin per part by weight of coating and said coating comprises about 2 parts by weight of spermaceti wax per part by weight of ethylcellulose.

8. The composition of claim 1 wherein said penicillin is ampicillin and said coated particles comprise about 9 parts by weight of ampicillin per part by weight of coating and said coating comprises about 1.3 parts by weight of spermaceti wax and 0.7 part by weight of hydrogenated castor oil per part by weight of ethylcellulose.

9. The composition of claim 8 comprising at least about 50 mgm. of said penicillin.

10. A method of coating a penicillin selected from the group consisting of ampicillin, hetacillin, nafcillin, oxacillin, cloxacillin, dicloxacillin and flucloxacillin and mixtures thereof which comprises suspending micronized particles of the penicillin in a solution comprising ethylcellulose and from about 1 to about 3 parts by weight of spermaceti wax per part by weight of ethylcellulose in a nonreactive volatile organic solvent to produce a suspension, wherein said penicillin is present in the proportion of from about 9 parts by weight of penicillin per part by weight of ethylcellulose and spermaceti wax to about 7 parts by weight of ethylcellulose and spermaceti wax per part by weight of penicillin, spraying said suspension into a heated nonreactive gaseous medium at a temperature of about 240° to 260° F. to produce coated particles and recovering the coated penicillin particles produced thereby having a particle size not larger than 40 mesh; said coated particles having improved taste and the penicillin contained therein being efficiently absorbed from the human gastrointestinal tract upon oral administration of a composition comprising said coated penicillin particles and a pharmaceutical carrier.

References Cited
UNITED STATES PATENTS

| | | | |
|---|---|---|---|
| 2,487,336 | 11/1949 | Hinds | 424—38 |
| 2,805,977 | 9/1957 | Robinson et al. | 424—35 |
| 2,902,407 | 9/1959 | Gross et al. | 424—271 |
| 2,921,883 | 1/1960 | Reese et al. | 424—35 |
| 2,980,589 | 4/1961 | De Grunigen | 424—271 |
| 3,247,065 | 4/1966 | Koff | 424—35 |

STANLEY J. FRIEDMAN, Primary Examiner

U.S. Cl. X.R.

424—38, 155, 271